United States Patent
Milton

[11] 3,901,582
[45] Aug. 26, 1975

[54] MIRRORED OPTICAL CONNECTOR

[75] Inventor: A. Fenner Milton, Washington, D.C.

[73] Assignee: The United States of America as represented by the Secretary of the Navy, Washington, D.C.

[22] Filed: Nov. 29, 1974

[21] Appl. No.: 528,517

[52] U.S. Cl. .............................. 350/96 C; 350/96 B
[51] Int. Cl.² ............................................ G02B 5/16
[58] Field of Search ............... 350/96 C, 96 B, 96 R

[56] References Cited
OTHER PUBLICATIONS
IBM Tech. Disc. Bul. Vol. 16, No. 5 Oct. 1973, pg. 1470–1471, L. Cooper.

*Primary Examiner*—John Kominski
*Attorney, Agent, or Firm*—R. S. Sciascia; Arthur L. Branning; M. L. Crane

[57] ABSTRACT

A connector for providing input-output couplings to optical transmission lines without interrupting the optical radiation flow. A transparent 45° prism is inserted between scrambling rods connected between ends of the transmission line. Part of the surface of the prism has mirror coatings. Auxiliary rods having input and output couplings are then bonded at right angles to the prism to provide the coupling.

4 Claims, 4 Drawing Figures

PATENTED AUG 26 1975 3,901,582

MIRRORED OPTICAL CONNECTOR

This invention is an improvement over coupler work of Henry F. Taylor of the Naval Electronics Laboratory Center, San Diego, Calif. reported in *Electronics* pp 30–31, Dec. 20, 1973.

BACKGROUND OF THE INVENTION

This invention relates to optical connectors for connecting a multimode fiber optic bundle transmission line into a main multimode fiber optical bundle transmission line without completely interrupting the radiation transmitted over the main transmission line.

Heretofore optical fiber bundles have been used for transmitting light from one place to another. Straight-through couplings have been used which permit coupling two optical fiber bundles together without any light loss between the bundle paths. There is a need for coupling light into and from an optical transmission line without interrupting the flow of transmission. Such lines may be used for communications, as well as other purposes.

Prior art fiber bundles have been cut and mirrors placed therein for reflecting light from a portion of the fiber bundle. In this device, the fiber transmission line is cut so that some radiation in the line is blocked. In this device, some information may be lost because some fibers are cut and no radiation will pass through those cut fibers.

Application Ser. No. 395,679 filed Sept. 10, 1973 is directed to a through "T" coupler which includes a couple of end scrambler elements that serve to ensure that input light is evenly distributed over the bundle. Thus, radiation transmitted over a main transmission line has been evenly distributed by other means.

SUMMARY OF THE INVENTION

The T connector-coupler of this invention provides means for coupling additional optical radiation onto a main transmission line without the use of any sharp bends in the transmission line. The coupler-connector is secured within a main transmission line so that a portion of the radiation may be directed into an auxiliary line and/or radiation from an auxiliary line may be added to radiation transmitted through the main transmission line. A 45° prism - optical material element is used in combination with end scramblers to carry out the above. The input and output cross sectional areas equal the area of the portion of the main bundle area which is interrupted by the coupler without any light escaping from the coupler. To avoid loss, the scrambler rods and coupler materials should have a numerical aperture equal to or higher than the numerical aperture of the fibers used. The prism should be made of a material of slightly higher index of refraction than the rest of the coupler so that larger input cross sectional areas can be used with smaller output cross sectional areas without introducing losses. The index of refraction difference has to be larger if higher numerical aperture fibers are used. The coupler-connectors are bidirectional.

COMPLETE DESCRIPTION

Figure 1:
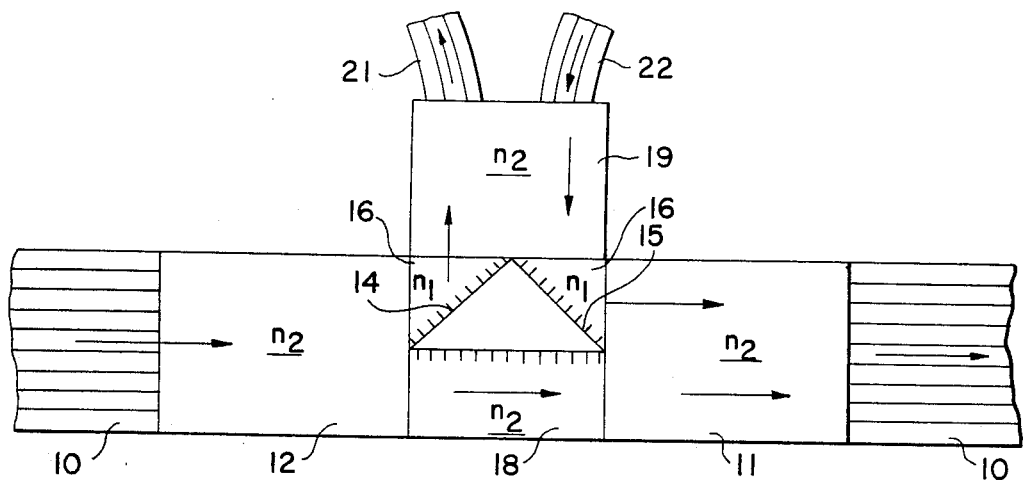
FIG. 1 illustrates a side view of a bidirectional T coupler-connector including a mirrored surface triangular prism therein.

Now referring to the drawings wherein the same reference characters refer to like parts, there is shown in FIG. 1, an optical radiation coupler-connector made in accordance with the teaching of this invention. As shown, the connector-coupler is secured within a main optical multimode fiber optic bundle transmission line 10 so that the ends of the main transmission line are joined in optical alignment with the adjacent ends of optically transparent cylinders 11, 12 which are sufficiently long for the light from each different optical fiber element of the transmission to be reflected in the scrambler sufficient times to mix and emerge from the end of the scrambler elements as a composite radiation beam. The ends of the scrambler rods adjacent the main transmission line have the same cross sectional area as that of the main transmission line so that all radiation will be transmitted from the main transmission line into the adjacent scrambler. The scrambler elements 11 and 12 are separated by a triangular 45° prism 13 surrounded on its faces 14, 15 by an optically transparent material 16 that has an index of refraction $N_1$ which is greater than that of the scramblers $N_2$ where $N_1 > N_2$. The 45° prism is enclosed within the upper half of the connector so that radiation in the lower half is transmitted from the scrambler ends directly through the lower element 18 upon which the prism rests and which has the same index of refraction as the end scramblers. The faces of the 45° prism are coated with a mirror reflective coating so that incident radiation is reflected therefrom. An upper scrambler arm 19 optically connects input and output auxiliary fiber optic transmission lines 21 and 22 to the coupler. The coupler-connector is bidirectional so that radiation transmitted in the main transmission line from the left will enter the scrambler arm 12. The radiation will be scrambled by arm 12 from which one-half will pass directly through the element 18 to scrambler arm 11 and into the main transmission line. The other half of the radiation entering scrambler arm 12 will be incident on the mirrored surface 14 of the prism and be directed out through arm 19 and out through the auxiliary transmission line 21. Radiation may be added to the system through use of auxiliary transmission line 22 which directs radiation through arm 19 onto the mirrored surface 15 of the 45° prism out through scrambler arm 11 and into the main transmission line. The coupler will operate similarly from the right. Thus, radiation may pass directly through the coupler, be directed out of the system to an auxiliary transmission line, and radiation may be added to the system. The coupler-connector elements 11, 12, 17 and 18 are either rectangular or square in cross section so that no radiation will be lost. Further, the scrambler arms have a numerical aperture which is equal to or higher than the numerical aperture of the optical fibers used. The prism is made of an optical material of slightly higher index of refraction than the other materials so that larger input cross sectional areas can be used with smaller output cross sectional areas without introducing radiation losses. Thus, the index of refraction difference must be larger if higher numerical aperture fibers are used.

Figure 2:
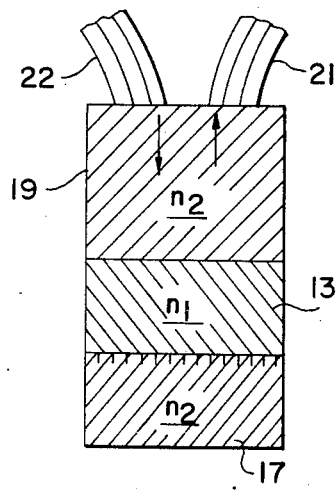
FIG. 2 is a cross sectional view of the device of FIG. 1 taken along lines 2—2.

FIG. 2 is a cross sectional view through the coupler-connector of FIG. 1 along lines 2—2 illustrating the cross sectional configuration of the elements.

Figure 3:
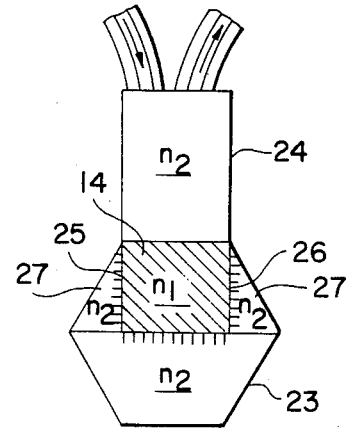
FIGS. 3 and 4 are modifications of the coupler-connector illustrated in FIG. 1.

FIG. 3 illustrates an end view of a modification of the device of FIG. 1 which illustrates the scrambler arm 23,24 having a hexagonal cross sectional shape. In this modification, the ends 25,26 of the triangular prism are mirrored and an optical transparent material 27 fills out the hexagonal shape of the central element with in which the prism is enclosed. The difference between the device of FIG. 1 and that of FIG. 3 is in the shape of the scrambler arms and the central section. Each are shaped as a hexagon.

Figure 4:
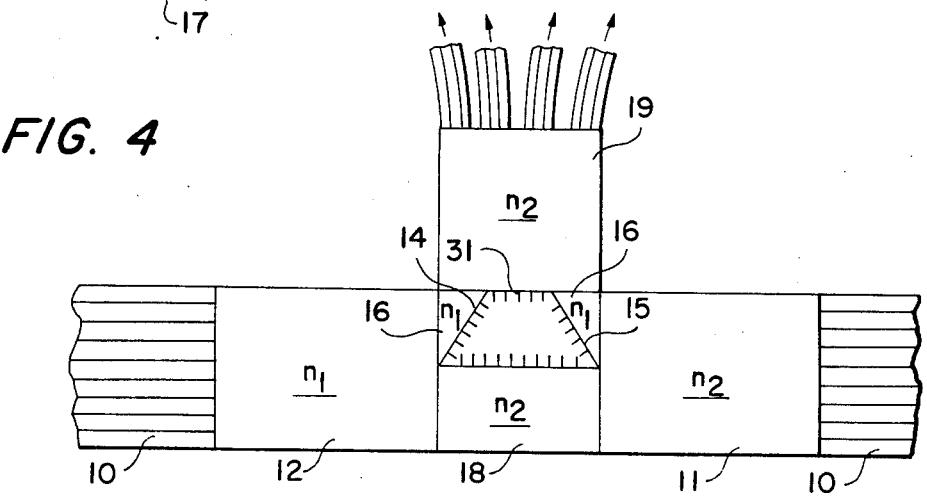

FIG. 4 illustrates a modification of the coupler-connector of FIG. 1 in which the peak of the triangular prism has been cut off to provide a flat surface 31 between the mirrored faces 14 and 15. In this modification, the central through element 18 comprises more than one-half of the element since the cut-off prism is not as high as the entire prism. The scrambler arms are the same, however separate additional input and output auxiliary transmission lines have been added. In this modification, some of the radiation added through the input auxiliary transmission line may be reflected by the flat top surface of the prism out through the output auxiliary transmission line thereby adding additional radiation to the output lines. The radiation transmitted through the main transmission line will pass some through element 18 and some will be reflected by the prism. That reflected by the prism can have additional radiation added thereto through use of the flat top mirror which reflects some of the radiation added through the input transmission line. The radiation added by the input transmission line not reflected by the upper surface will be incident on the angular surface of the prism and be reflected out through the scrambler arm in which it is mixed with the radiation transmitted into the coupler from the main transmission line and which passes straight through the central element.

In each of the modifications, the upper scrambler arm to which the input and output auxiliary transmission lines are connected is perpendicular to the axis of the coupler element and the faces of the prism are at a 45° angle relative to the axis of the coupler. Therefore radiation will be reflected at 90° angles with respect to its input into the coupler.

Further, in each modification, the number of different auxiliary input and output transmission lines may be different. The number is limited only by the cross sectional size of the upper arm and the number of fiber optic lines that can be connected thereto. Therefore, different information may be added as desired and the output through the auxiliary lines may be directed to separate detector elements.

The optical transmission elements may have a cladding surrounding them or have a coating which is well known in the fiber optic art.

Obviously many modifications and variations of the present invention are possible in light of the above teachings. It is therefore to be understood that within the scope of the appended claims the invention may be practiced otherwise than as specifically described.

What is claimed and desired to be secured by Letters Patent to the United States is:

1. An optical coupler-connector for providing input into and output from a main optical multimode fiber optic transmission line, which comprises:
   first and second optically transparent scrambler arms;
   said scrambler arms optically bonded at one end to the ends of said main transmission line;
   a central element optically connected between said first and second scrambler arms;
   said central element including a 45° prism with mirrored faces in one half section thereof and a solid rod forming the remainder of said central element;
   said 45° prism positioned with its mirrored faces at a 45° angle relative to an axial line through said first and second scrambler arms of said coupler-connector;
   a third scrambler arm optically secured to said central element with its optical axis perpendicular to the axis through said first and second scrambler arms; and
   input and output auxiliary transmission lines optically connected with said third scrambler arm.

2. An optical coupler-connector as claimed in claim 1; in which
   each of said scrambler arms are rectangular in cross section.

3. An optical coupler-connector as claimed in claim 1; in which,
   each of said scrambler arms are at least a hexagon in cross section.

4. An optical coupler-connector as claimed in claim 1; wherein,
   said mirrored prism has a flat upper surface facing perpendicular to the optical path of said input and said output auxiliary transmission lines.

* * * * *